United States Patent [19]
Yasuda

[11] Patent Number: 5,834,567
[45] Date of Patent: Nov. 10, 1998

[54] BIODEGRADABLE COPOLYMER, A BIODEGRADABLE POLYMER COMPOSITION, A BIODEGRADABLE ARTICLE, AND A PREPARATION PROCESS THEREOF

[75] Inventor: Hajime Yasuda, Hiroshima-ken, Japan

[73] Assignee: Daicel Chemical Industries, Ltd., Osaka-fu, Japan

[21] Appl. No.: 801,786

[22] Filed: Feb. 18, 1997

Related U.S. Application Data

[63] Continuation of Ser. No. 434,195, May 3, 1995, abandoned.

[30] Foreign Application Priority Data

May 9, 1994 [JP] Japan ........................ 6-120588
Dec. 21, 1994 [JP] Japan ........................ 6-335862

[51] Int. Cl.$^6$ ............... C08G 65/26; C08G 64/18; C08G 63/664; C08L 67/04
[52] U.S. Cl. ............. 525/411; 525/413; 525/415; 528/354; 528/357
[58] Field of Search ................. 525/411, 413, 525/415; 528/354, 357

[56] References Cited

U.S. PATENT DOCUMENTS

| | | | |
|---|---|---|---|
| 3,489,819 | 1/1970 | Busler | ........................ 525/411 |
| 3,689,531 | 9/1972 | Critchfield . | |
| 5,352,515 | 10/1994 | Jarrett | ........................ 525/415 |

FOREIGN PATENT DOCUMENTS 262858  10/1993  Japan ........................ 528/354

OTHER PUBLICATIONS

Duda "Preparation of Telechelic Polyester Oligodiols" *Macromolecules* 27(2); 1994 pp. 576–582.

*Primary Examiner*—David Buttner
*Attorney, Agent, or Firm*—Sughrue, Mion, Zinn, Macpeak & Seas, PLLC

[57] ABSTRACT

Disclosed are a biodegradable copolymer and a biodegradable article molded therefrom, said copolymer having a number average molecular weight ranging from 1,000 to 1,000,000 consisting essentially of (A) from 5 to 99% by mol of epsilon-caprolactone or delta-valerolactone structural units and (B) from 95 to 1% by mol of oxetane structural units, said structural units being combined in the state of a block, and containing an organic aluminum-based Lewis acid represented by general formula (I)

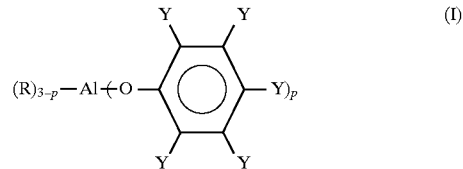

wherein R is an alkyl group having a carbon number ranging from 1 to 4, Y is independently selected from a substituted group, and p is any one of 1, 2 and 3. Also disclosed are block polymers of lactone and dimethyltrimethylene carbonate and blends of polylactone with polyoxetane.

3 Claims, 12 Drawing Sheets

P(CL/DTC=70/30)

P(CL)

BIODEGRADABLE COPOLYMER, A BIODEGRADABLE POLYMER COMPOSITION, A BIODEGRADABLE ARTICLE, AND A PREPARATION PROCESS THEREOF

This is a Continuation of application Ser. No. 08/434,195, filed May 3, 1995 now abandoned.

FIELD OF THE INVENTION

The present invention relates to a biodegradable copolymer and a biodegradable copolymer composition. Furthermore, the present invention relates to a biodegradable article molded from the copolymer or the copolymer composition. Still further, the present invention relates to a process for the preparation of a biodegradable lactone-carbonate random copolymer. In more detail, the present invention relates to a copolymer or a composition which is capable of being applied as materials for various molded containers such as bottles, trays, box-type packages, and various molded articles, such as films for laminating the inside of paper containers, films for wrapping, films for agricultural uses, fibers, lines for fishing, ropes, nonwoven clothing, nets for construction, etc., which are substantially disposed in surroundings or circumstances in view of purposes for the use thereof.

The lactone-carbonate random copolymer prepared by the process is also excellent in biodegradability and transparency, making it possible to be used as biodegradable articles and medical devices, etc.

BACKGROUND OF THE INVENTION

Generally speaking, synthetic high polymers have been used as materials for various molded articles because of their excellence in mechanical properties and moldability, etc., and low price.

However, molded articles cannot be naturally degraded even when disposed or buried, because of their durability, for example, weatherability, etc., and further, in the case when such articles are burned, these may damage incinerators because of the high-calorie energy generated in the burning thereof.

Accordingly, methods for disposing of plastic wastes have recently become problematic. Therefore, there have been discovered synthetic high polymers from which compounds not adversely affecting surroundings or circumstances and living bodies are produced by biodegradation.

As synthetic high polymers, poly(epsilon-caprolactone)s are known, and a demand thereof in the market has increased because of being manufactured at a relatively low price and as a safe biodegradable resin.

The magazine Practical and Biodegradable Plastics (page 42, 1992) published by CMC, Ltd., cites many references described concerning the biodegradability of a poly(e-caprolactone). In 1972, Potts et al. found that a Poly(epsilon-caprolactone) having a high molecular weight (40,000) disappeared after being buried for 1 year [Am. Chem. Soc. Polymer Preprint, 13, 629 (1972)]. In 1975, Diamond et al. reported that a film prepared from a poly(epsilon-caprolactone) was degraded by Aspergillus or in soil [Int. Biodetr. Bull., 11, 127 (1975)]. In 1976, Tokiwa et al reported that a poly(epsilon-caprolactone) having a number average molecular weight of 25,000 was almost completely degraded in 12 days by a fungus of *Penicillium sp.* strain 26-1 isolated from soil [J. Ferment Technol., 54, 603 (1976)].

According to unpublished data provided by the Biodegradable Plastics Study Party/Technology Meeting, as a result of field tests by burying in soil and immersion in water carried out by the Biodegradable Plastics Study Party, it is reported that disappearance of poly(epsilon-caprolactone)s began after 6 months in many places and it disappeared after 1 year in almost all places.

However, the biodegradation rate is largely affected by the conditions in surroundings or circumstances, specifically, soil or types of microorganisms and living concentrations thereof, and temperatures. Accordingly, it is supposed that such a biodegradation rate in poly(epsilon-caprolactone)s is not occasionally satisfied, depending upon the uses.

Furthermore, Japanese Patent Publication (Kokoku) No. 3396/1967 states that useful polymer products can be prepared by bulk polymerization, suspension polymerization, and solution polymerization using a larger mol % of a cyclic ester such as epsilon-caprolactone and a smaller mol % of a cyclic carbonate monomer such as 4,4-dimethyl-2,6-dioxacyclohexanone, and polymer products are useful for manufacturing grips for brushes, buttons, lamp stands, and toys, etc.

However, Kokoku No. 3396/1967 does not state that copolymers and copolymer compositions thereof described in the present invention are biodegradable, or that biodegradable articles molded therefrom.

In the meantime, Japanese Patent Unexamined Publication (Kokai) No. 294326/1990 states a process for the preparation of a block copolymer composed of a lactone monomer and a cyclic carbonate monomer in which there is employed an organometallic compound such as n-BuLi, etc., as an initiator. Furthermore, there is known a process for the preparation of a lactone-carbonate block copolymer in which there is employed a trimethyl aluminum-water complex or a rare earth metal as an initiator.

Still further, Y. Okamoto reports in Macromol. Chem., Symp. 42/43, 117–133 (1991), that a cationic ring-opening polymerization process for the preparation of a lactone polymer having low molecular weight in which there is employed a triethyloxonium-hexafluorophosphate as an initiator.

In addition, U.S. Pat. No. 3,301,824 discloses a process for the preparation of a homopolymer of a cyclic carbonate monomer and a graft polymer of a cyclic carbonate monomer and a lactone monomer using stannous chloride or tin octylate, etc., as catalysts.

In addition, Japanese Patent Unexamined Publication (Kokai) No. 502651/1991 (corresponding to WO89/05664 Publication) also discloses the use of a copolymer having recurring carbonate units as bioresorbable medical devices capable of being assimilated by living bodies by degrading into biologically innocuous components after degradation or implantable and undegradable medical devices having affinity to blood and/or living bodies.

In Kokai No. 502651/1991, there are employed tin salts such as stannous octoate (2-ethyl-hexanoate), etc., as catalysts for preparing the random copolymer.

Also, Japanese Patent Unexamined Publication (Kokai) No. 508627/1-993 (corresponding to WO91/16887 Publication) discloses the use of a random copolymer composed of trimethylene carbonate and caprolactone as a biodegradable reservoir device. Also, in Kokai No. 508627/1993, there are employed tin salts such as stannous octoate (2-ethyl-hexanoate) or stannous chloride, etc., as catalysts for preparing the random copolymer. More specifically, Kokai No. 508627/1993 discloses the use of a random copolymer composed of trimethylene carbonate and caprolactone as a biodegradable reservoir device or bioabsorbable pharmaceutical devices (e.g., a cylindrical capsule having a 2.4 mm outer diameter and a thickness of 0.1–0.3 mm) for a drug delivery system which can sustainably discharge medicines in living bodies.

In order to have caprolactone-carbonate copolymers exhibit biodegradability, bioabsorbability, and biostability, and provide mechanical strength, transparency, and moldability, lactone monomers and carbonate monomers must be absolutely and unfailingly copolymerized in the state of random. However, in the case of a process in which an organic lithium, triethylaluminum-water based complexes, or rare earth element complexes are employed as initiators, only block copolymers having a high content of a block structure are prepared, and random copolymers cannot be prepared.

Furthermore, in a process in which tin salts typified by stannous octoate are employed as catalysts, there are problems as described below: (1) Polymerization rate is slow, (2) yield is low, (3) it is difficult to obtain random copolymers having a high molecular weight, (4) molecular weight distribution in the copolymers is broad, and (5) tin salts have undesirable properties such as toxicity, allergens, mutagens, etc.

In view of this background, and as a result of extensive investigation, the inventor of this invention has now found that a novel copolymer prepared by the copolymerization of epsilon-caproiactone or delta-valerolactone with oxetane or dimethyltrimethylene carbonate and copolymer composition thereof are excellent in biodegradability, and therefore articles molded therefrom are exceedingly useful as biodegradable articles, and the present invention has been now completed.

Furthermore, the inventor of this invention has now found a process for the preparation of a lactone-carbonate random copolymer which comprises a ring-opening addition polymerization of an admixture composed of a lactone monomer and a cyclic carbonate monomer with a ring-opening initiator in the presence of a specified organic aluminum-based Lewis acid.

SUMMARY OF THE INVENTION

It is an object of the present invention to provide a biodegradable copolymer, a biodegradable copolymer composition, biodegradable molded article therefrom, and a process for the preparation of a lactone-carbonate random copolymer.

A first aspect of the present invention relates to a biodegradable copolymer having a number average molecular weight ranging from 1,000 to 1,000,000 which comprises (A) from 5 to 99% by mol of epsilon-caprolactone or delta-valerolactone structural units and (B) from 95 to 1% by mol of oxetane structural units, said structural units being combined in the state of a block.

A second aspect of the present invention relates to a biodegradable copolymer having a number average molecular weight ranging from 1,000 to 1,000,000 which comprises (A) from 5 to 99% by mol of epsilon-caprolactone or delta-varelolactone structural unit and (C) from 95 to 1% by mol of a dimethyltrimethylene carbonate structural unit, said structural units being combined in the state of a random block.

A third aspect of the present invention relates to a biodegradable polymer composition which comprises (D) from 60 to 95% by mol of a poly(epsilon-caprolactone) or poly(delta-valerolactone) and (E) from 40 to 5% by mol of a poly(oxetane).

A fourth aspect of the present invention relates to a biodegradable article molded from a copolymer in the first aspect.

A fifth aspect of the present invention relates to a biodegradable article molded from a copolymer in the second aspect.

A sixth aspect of the present invention relates to a biodegradable article molded from a copolymer composition in the third aspect.

A seventh aspect of the present invention relates to a process for the preparation of a lactone-carbonate random copolymer which comprises a ring-opening addition polymerization of an admixture composed of a lactone monomer and a cyclic carbonate monomer with a ring-opening initiator in the presence of an organic aluminum-based Lewis acid represented by general formula (I)

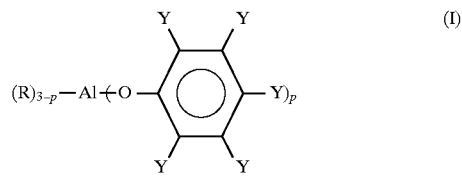

wherein R is an alkyl group having a carbon number ranging from 1 to 4, y is independently selected from a substituted group, and p is any one of 1 2, and 3.

An eighth aspect of the present invention relates to a biodegradable copolymer composition which comprises a lactone-carbonate random copolymer obtained by a ring-opening addition polymerization of an admixture composed of a lactone monomer and a cyclic carbonate monomer with a ring-opening initiator in the presence of an organic aluminum-based Lewis acid represented by general formula (I)

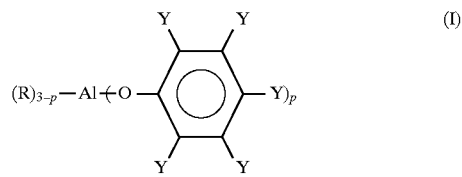

wherein R is an alkyl group having a carbon number ranging from 1 to 4, y is independently selected from a substituted group, and p is any one of 1, 2, and 3.

DETAILED DESCRIPTION OF THE INVENTION

Figure 1:
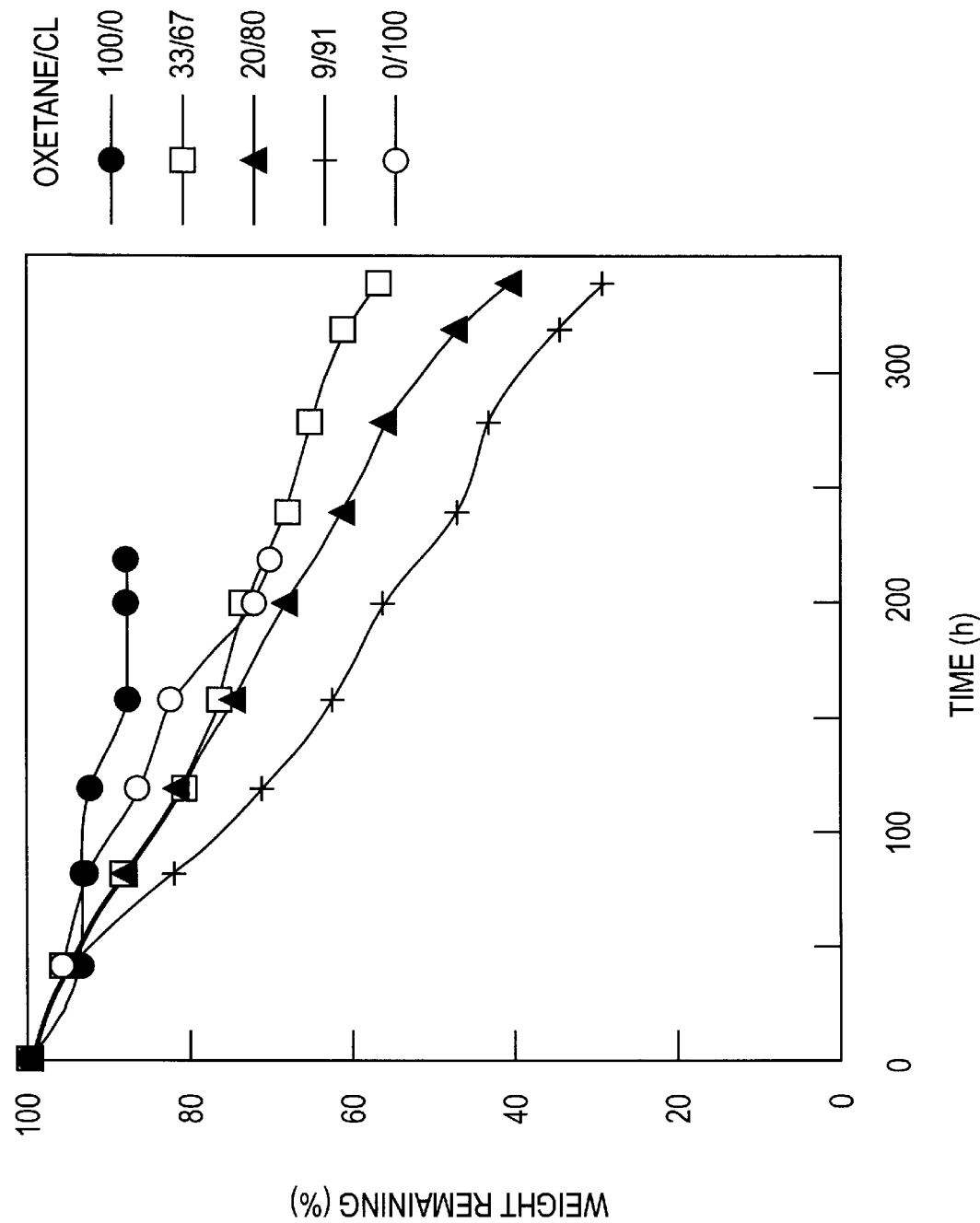
FIG. 1 (Example 2) is a graph representing a remaining ratio of weight versus incubation time by an enzyme for degradation related to the copolymer obtained in Example 1.

The present invention will be described hereinafter in more detail.

According to a first aspect of the present invention, there is provided a biodegradable copolymer having a number average molecular weight ranging from 1,000 to 1,000,000 which comprises (A) from 5 to 99% by mol of epsilon-caprolactone or a delta-valerolactone structural unit and (B) from 95 to 1% by mol of an oxetane structural unit, said structural units being combined in the state of a block.

According to a second aspect of the present invention, there is provided a biodegradable copolymer having a number average molecular weight ranging from 1,000 to 1,000,000 which comprises (A) from 5 to 99% by mol of epsilon-caprolactone or delta-valerolactone structural unit and (C) from 95 to 1% by mol of a dimethyltrimethylene carbonate structural unit, said structural units being combined in the state of a random block.

According to a third aspect of the present invention, there is provided a biodegradable polymer composition which comprises (D) from 60 to 95% by mol of a poly(epsilon-caprolactone) or a poly(delta-valerolactone) and (E) from 40 to 5% by mol of a poly(oxetane).

According to a fourth aspect of the present invention, there is provided a biodegradable article molded from a copolymer having a number average molecular weight ranging from 1,000 to 1,000,000 which comprises (A) from 5 to 99% by mol of epsilon-caprolactone or delta-valerolactone structural unit and (B) from 95 to 1% by mol of an oxetane structural unit, said structural units being combined in the state of a block.

According to a fifth aspect of the present invention, there is provided a biodegradable article molded from a copolymer having a number average molecular weight ranging from 1,000 to 1,000,000 which comprises (A) from 5 to 99% by mol of epsilon-caprolactone or delta-varelolactone structural unit and (C) from 95 to 1% by mol of a dimethyltrimethylene carbonate structural unit, said structural units being combined in the state of a random block.

According to a sixth aspect of the present invention, there is provided a biodegradable article molded from a biodegradable copolymer composition which comprises (D) from 60 to 95% by mol of a poly(epsilon-caprolactone) or poly (delta-varelolactone) and (E) from 40 to 5% by mol of a poly(oxetane).

Monomers to be employed in the biodegradable copolymers or composition, and the biodegradable articles of the present invention include epsilon-caprolactone, delta-varelolactone, oxetane (another name for this is trimethylene oxide or 1,3-epoxypropane), and dimethyltrimethylene carbonate (another name for this is 4,4-dimethyl-2,6-dioxacyclohexanone), which are essential structural units, respectively.

The biodegradable copolymer which is the first aspect of the present invention is an epsilon-caprolactone-oxetane copolymer or delta-varelolactone oxetane copolymer which is a block type. The biodegradable copolymer which is the second aspect of the present invention is an epsilon-caprolactone-dimethyltrimethylene carbonate copolymer or delta-varelolactone-dimethyltrimethylene carbonate copolymer which is a block type.

The block copolymers are not particularly limited in the type of their block structures, which include a random block type, diblock type, triblock type, etc., and, further, these are classified into a linear type, branch type, and radial type.

Particularly, in the epsilon-caprolactone-dimethyltrimethylene carbonate block copolymer and delta-valerolactone-dimethyltrimethylene carbonate copolymer which contain dimethyltrimethylene structures, there are preferred random-type copolymers which are excellent in biodegradability.

The above-described block copolymers essentially have a number average molecular weight ranging from 1,000 to 1,000,000, preferably from 10,000 to 500,000, more preferably from 30,000 to 300,000 based on a standard polystyrene measured by a GPC.

In the case when the number average molecular weight is less than 1,000, the copolymers are frequently in liquid states at ordinary temperatures, unpreferably resulting in being incapable of using as molded articles. In contrast, in the case when it exceeds 1,000,000, it is substantially difficult to prepare the copolymers, and the biodegradability thereof would occasionally unpreferably lower.

In the case when there are molded the above-described block copolymers alone or a mixed composition containing more than 50% by weight of the copolymers, the number average molecular weight preferably ranges from 30,000 to 300,000, more preferably from 50,000 to 200,000, from a viewpoint of a balance between mechanical properties, moldability, biodegradability, etc.

The content of the epsilon-caprolactone structural unit or delta-valerolactone structural unit in the above-described block copolymers generally ranges from 5 to 99% by mol, preferably from 50 to 98% by mol, more preferably from 70 to 95% by mol, based on the total contents containing the oxetane structural units or dimethyltrimethylene structural units.

In the case when the content is less than 5% by mol or exceeds 99% by mol, biodegradability thereof is unpreferably poor.

In the biodegradable copolymer which is the first aspect of the present invention, a copolymer having a number average molecular weight ranging from 30,000 to 300,000, an epsilon-caprolactone structural unit or a delta-valerolactone structural unit ranging from 70 to 95% by mol and oxetane structural unit ranging from 30 to 5% by mol exhibits mechanical properties, thermal stability, and moldability, etc., equal to an epsilon-caprolactone or delta-valerolactone homopolymer, and it is particularly excellent also in biodegradability. The bond between the epsilon-caprolactone structural unit and the oxetane structural unit is represented by —CO—$(CH_2)_5$—O—$(CH_2)_3$—O—, and similarly, the bond between the delta-valerolactone structural unit and the oxetane structural unit is represented by —CO—$(CH_2)_4$—O—$(CH_2)_3$—O— which essentially constitutes the biodegradable copolymer which is the first aspect of the present invention. The bond between the epsilon-caprolactone structural unit and the dimethyltrimethylene carbonate structural unit is represented by —CO—$(CH_2)_5$—OCOOCH$_2$C(CH$_3$)$_2$—CH$_2$O—, and similarly, the bond between the delta-valerolactone structural unit and the dimethyltrimethylene carbonate structural unit is represented by —CO—$(CH_2)_4$—OCOOCH$_2$C(CH$_3$)$_2$—CH$_2$O— which essentially constitutes the biodegradable copolymer which is the second aspect of the present invention.

The biodegradable copolymers which are the first and second aspects of the present invention can be prepared without particular limitations, that is, the copolymers are prepared by any processes in which epsilon-caprolactone or delta-valerolactone can be copolymerized with oxetane or dimethyltrimethylene carbonate. Specifically, there are preferred processes using an organometallic compound which is an initiator.

As examples of the organometallic compound, there are specifically exemplified trialkylaluminum-water based complexes, zinc dialkylate-water based complexes, alkyl lithiums, organic potassium compounds, and organic sodium compounds. Of those, trialkylaluminum-water based complexes, more specifically, triethyl aluminum-water based complexes are preferably employed. In the above-described complexes, although a polymerization activity becomes maximum in the case when the molar ratio is 1/1, the molar ratio of water/trialkylaluminum ranges preferably from 0.7 to 1.1.

The copolymerization process between epsilon-caprolactone or delta-varelolactone and dimethyltrimethylene carbonate using the triethyl aluminum-water based complexes which is an initiator is disclosed in Japanese Patent Kokoku No. 3396/1967, which can be used also in the present invention.

It is to be noted that there is no known copolymerization process between epsilon-caprolactone or delta-valerolactone and oxetane using the triethyl aluminum-water based complexes which is an initiator.

In the case that the copolymer of the first aspect is prepared, oxetane is not readily copolymerized with epsilon-caprolactone due to the difference of the copolymerization rate between oxetane and epsilon-caprolactone.

Accordingly, there is preferably carried out a process that oxetane alone is partially or totally polymerized using a triethyl aluminum-water-based complex as an initiator at a temperature ranging from −20° to 40° C., and then epsilon-caprolactone is charged to copolymerize with the resulting oxetane homopolymer at a temperature ranging from 0° to 180° C., preferably from 50° to 150° C.

On the other hand, oxetane can be copolymerized with delta-varelolactone due to a similar copolymerization rate between oxetane and delta-varelolactone. Accordingly, there is preferably carried out a process in which oxetane and delta-valerolactone can be simultaneously charged to copolymerize using a triethyl aluminum-water-based complex as an initiator at a temperature ranging from 0° to 180° C.

In the case when the copolymerization is carried out beyond the above-described temperature range, the content of block type polymer would be unpreferably lowered.

The copolymerization of epsilon-caprolactone or delta-valerolactone with dimethyl trimethylene carbonate can be carried out by mixing these with each other, followed by feeding a triethyl aluminum-water-based complex as an initiator, at a temperature ranging from 0° to 180° C.

The biodegradable copolymers of the first and second aspect of the present invention can be prepared without any limitations using popular polymerization procedures and equipment for the preparation.

As commonly used procedures, there are exemplified bulk polymerization, solution polymerization, and sedimentation polymerization.

As the solvents in the above-described solution polymerization, there are employed aromatic hydrocarbons such as benzene, toluene, xylene, etc., ethers such as diethylether, etc. Also, the solvents can be mixed with aliphatic hydrocarbons such as hexane, heptane, cyclohexane, etc., in a range capable of dissolving the resulting polymers.

As commonly used equipment for the preparation, there can be employed a continuous, semicontinuous, and batch-type equipment without any problem. Particularly, a Sultzer-mixer type or an extruder type continuous-polymerization equipment is preferably employed in bulk polymerization, in view of the capability of economically manufacturing the biodegradable copolymer of the present invention on a large scale.

In the above-described bulk polymerization and procedures for the preparation, polymerization are preferably carried out in a temperature ranging from 40° to 180° C., and preferably from 100° to 170° C.

In the case when the temperature is below 40° C., the viscosity of copolymers is too high, resulting in difficulty of manufacture, and, on the contrary, in the case when the temperature exceeds 180° C., there is caused the problem that a polymer unpreferably changes colors, and the content of the block type polymers is lowered.

In solution polymerization or sedimentation polymerization, it is preferably carried out in a temperature ranging from −20° C. to the boiling points of solvents.

In the case when the temperature is below −20° C., the content of a block-type polymer would be unpreferably lowered, and polymerization rate would be unpreferably slow. On the contrary, in the case when the temperature exceeds the boiling points of the solvents, the polymerization system would be unpreferably maintained at compressed conditions.

In the biodegradable copolymers of the first and second aspect in the present invention, other copolymerizable monomers can be employed together with epsilon-caprolactone, delta-valerolactone, dimethyl trimethylene carbonate, and oxetane. Examples of other copolymerizable monomers include ethylene oxide, propylene oxide, tetrahydrofran, cyclic ethers such as dioxane or trioxane, beta-propiolactone, methylated caprolactone, lactones other than epsilon-caprolactone or delta-valerolactone, lactide which is a dimer of lactic acid, glicolides, cyclic carbonates such as trimethylene carbonate and methyltrimethylene carbonate, etc.

Furthermore, the biodegradable copolymers of the first and second aspect in the present invention can be also mixed with each other, and further with other biodegradable or unbiodegradable thermoplastics in any mixing ratio. Specific examples of other biodegradable thermoplastics include a polylactic acid, a polyglicolide, an aliphatic polyester, polylactones such as a poly(epsilon-caprolactone) or a poly(delta-valerolactone), starch, celluloses, and hydroxyethyl celluloses, etc.

The biodegradable polymer composition of the third aspect in the present invention is a mixed composition composed of poly(epsilon-caprolactone) homopolymer or a poly(delta-valerolactone) homopolymer and a poly(oxetane) homopolymer. In the biodegradable polymer composition, the poly(oxetane) homopolymer is employed in an amount ranging from 5 to 40 mol % based on the total amount.

In the case when the amount exceeds 40 mol % by mol or it is below 5 mol % by mol, biodegradability is unpreferably poor in the copolymer composition. It is to be noted that the above-described "mol %" shows the content of oxetane units based on 100 mol % of each monomer unit in the homopolymers.

Number average molecular weight in all of the homopolymers to be mixed ranges from 20,000 to 1,000,000, preferably from 30,000 to 500,000, and more preferably from 50,000 to 200,000.

In the case when number average molecular weight is below 20,000, moldability is poor because of a low melt viscosity of the homopolymer.

In the case when number average molecular weight exceeds 1,000,000, it is practically difficult to prepare the homopolymers, and biodegradability unpreferably tends to become poor.

The biodegradable polymer composition of the third aspect in the present invention also includes a three-homopolymer admixture composed of a poly(epsilon-caprolactone) homopolymer, a poly(delta-valerolactone) homopolymer, and a poly(oxetane) homopolymer.

A process for mixing the homopolymers is not limited, a conventional melt kneader such as an extruder can be preferably employed in an industrial fashion.

The biodegradable copolymers of the first and second aspect and the biodegradable polymer composition of the third aspect in the present invention can provide the biodegradable articles of the fourth, fifth and sixth aspect, respectively.

The biodegradable articles can be molded from biodegradable copolymers and the biodegradable polymer composition.

Biodegradable articles include all products which are usually left consciously or unconsciously in living circumstances from the viewpoint of usage.

Hitherto, there has been a problem that the products molded from resins were generally left in our living circumstances or surroundings without degradation for a long period after uses. The products include, for example, materials for agricultural uses such as films or nonwoven clothing, textiles, ropes, materials such as films or nonwoven clothes for engineering works, materials such as nets for construction use, materials such as oil spill blotters for protecting the environment, materials such as lines or nets for fishing, various foam materials (for example, life preservers, materials for cushions, buoys or markers for fishing nets, etc), coatings for ships (coatings for bottom of ships), films for protecting bottom of boats, bottles, trays, various containers such as box-type packages, internal films for laminating on paper containers, wrapping films for waste or shopping, cushion materials or protective films for goods to be exported (electrical appliances, precision parts, large-scale equipments), etc.

The above-described products molded from biodegradable copolymers or polymer compositions can be biologically degraded by being left in our living circumstances or surroundings, resulting in their being useful from the viewpoint of environmental protection.

According to a seventh aspect of the present invention, there is provided a process for the preparation of a lactone-carbonate random copolymer which comprises a ring-opening addition polymerization of an admixture composed of a lactone monomer and a cyclic carbonate monomer with a ring-opening initiator in the presence of an organic aluminum-based Lewis acid represented by general formula (I);

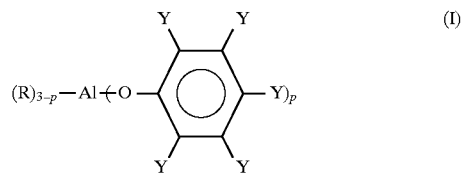

wherein R is an alkyl group having a carbon number ranging from 1 to 4, Y is independently selected from a substituted group, and p is any one of 1, 2 and 3.

According to an eighth aspect of the present invention, there is provided a biodegradable copolymer composition which comprises a lactone-carbonate random copolymer obtained by a ring-opening addition polymerization of an admixture composed of a lactone monomer and a cyclic carbonate monomer with a ring-opening initiator in the presence of an organic aluminum-based Lewis acid represented by general formula (I);

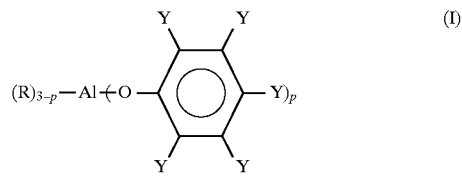

wherein R is an alkyl group having a carbon number ranging from 1 to 4, Y is independently selected from a substituted group, and p is any one of 1, 2 and 3.

Ring-opening initiators in the present invention include a compound having at least one active hydrogen atoms such as a hydroxyl group, amino group, carboxylic group, thiol group, and an active methylene group put between at least two electron-attractive groups in the molecule.

These are generally aliphatic alcohols and aliphatic polyvalent alcohols. More specifically, there are exemplified methanol, ethanol, isopropanol, ethyleneglycol, diethyleneglycol, butanediol, hexamethyleneglycol, neopentyl glycol, trimethylolpropane, pentaerythritol, 2-hydroxyethyl(meth)-acrylate, 4-hydroxybutyl(meth)acrylate, allylalcohol, a polyvinylalcohol, a 2-hydroxyethyl(meth)acrylate-modified polymer, and an adduct of ethylene oxide to bisphenol A, and the like.

As lactone monomers in the present invention, there can be generally employed publicly known lactones and, specifically, delta-valerolactone, epsilon-caprolactone, and an alkylated lactone thereof are preferably employed from a general or practical viewpoint. Of these, epsilon-caprolactone is preferably employed because it is manufactured industrially. One or more of the lactone monomers may be employed.

As cyclic carbonate monomers, there can be preferably employed propylglycol carbonate, 2-methylpropylglycol carbonate, neopentyl glycol carbonate, and the like.

One or more of the cyclic carbonate monomers may be employed.

Mixing ratio between the lactone monomer and the cyclic carbonate monomer is not particularly limited, both monomers are employed in an amount ranging from 10 to 90 parts by weight, preferably from 20 to 80 parts by weight, respectively, and more preferably one monomer is employed in an amount ranging from 20 to 40 parts by weight, and another monomer is employed in an amount ranging from 80 to 60 parts by weight.

Admixture composed of the lactone monomer and the cyclic carbonate monomer is employed in a molar ratio ranging from 1 to 10,000, preferably from 100 to 5,000, and more preferably from 500 to 2,000 based on 1 mol of initiators.

In the case when the molar ratio exceeds 10,000, it is unpreferred because the ring-opening rate of the cyclic monomers becomes slow.

The organic aluminum-based Lewis acid in the present invention is represented by the above-described general formula (I).

In the general formula (I), R is an alkyl group having a carbon number ranging from 1 to 4, Y is independently selected from a substituted group, and p is any one of 1, 2, and 3.

The alkyl group R specifically includes the methyl group, ethyl group, n-propyl group, iso-propyl group, n-butyl group, iso-butyl group, and tert-butyl group. Specific examples of the substituted group Y independently include hydrogen, an alkyl group such as a methyl group, ethyl group, butyl group, and tert-butyl group, and the like, an aryl group such as the phenyl group, and the like, a halogen such as fluorine, chlorine, and iodine, and the like, a trimethylsilyl group, and a trimethylgelmil group, and the like.

p is any one of 1, 2, and 3. In the case when p is 1, although the ring-opening addition reaction rate of the cyclic monomers becomes large, there is exhibited a tendency lowering the random structure content in the resulting copolymer and further, in the case when p is 3, it is difficult to prepare catalysts, resulting in that p is most preferably 2.

The organic aluminum-based Lewis acid in the seventh aspect of the present invention represented by above-described general formula (I) can be prepared by a reaction of an alkylphenol such as 2,6-diphenylphenol, 2,6-ditert-butyl-4-methylphenol, and 2,4,6-trichlorophenol, etc. with a trialkylaluminum such as tri-methylaluminum and triisobutylaluminum, etc.

In the reaction, an excessive amount of alkylphenol is allowed to react with the trialkylaluminum, specifically, in a molar ratio ranging from 5/1 to 1/1, preferably from 2.5/1 to 2/1. The reaction is preferably carried out in a temperature ranging from 0° C. to room temperatures.

The organic aluminum-based Lewis acid is obtained in the state of a white-colored crystalline after washing with an inert solvent such as hexane or in the state of a solution thereof.

In the seventh and eighth aspects of the present invention, an organic aluminum-based Lewis acid represented by general formula (II) as described below is preferably employed.

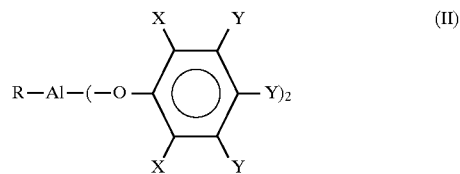

In the formula (II), R is an alkyl group having a carbon number ranging from 1 to 4, X is independently chosen among the tert-butyl group, phenyl group, chlorine, bromine, and iodine. Y is independently any appropriate substituted groups as indicated for the formula (I).

If X is chosen among groups such as a hydrogen and methyl group, the catalysts become sterically less hindered each other, thus giving rise to associability so that the coordinating effect of the lactone monomer, the cyclic carbonate monomer, and the admixture thereof on the catalysts decreases. Therefore, to obtain a highly random copolymer having an excellent biodegradability, X is preferably chosen among the groups which are indicated for the formula (II).

The organic aluminum-based Lewis acid represented by general formula. (I) is employed in a molar ratio ranging from 0.0001 to 1, preferably from 0.001 to 0.5, more preferably from 0.05 to 0.2 based on 1 mol of the initiators. In the case when the molar ratio is less than 0.0001, the ring-opening reaction of the cyclic monomers is slow, and in the case when it exceeds 1, it is meaninglessly only excessive in a practical manner.

In the process for the preparation of the biodegradable lactone-carbonate copolymer of the present invention, there are preferably refined lactone monomers, cyclic carbonate monomers, admixture thereof, and the organic aluminum-based Lewis acid as purely as possible, thereby enabling side reactions to be controlled.

For the same reason, improved apparatuses for the preparation are preferably employed so that the mixing of moisture and other impurities into starting materials can be prevented.

The total amount of the above-described impurities including moisture is desirably controlled within an amount of less than 5,000 ppm, preferably less than 500 ppm, and more preferably less than 50 ppm based on the total amount of starting materials. In the process of the present invention, solvents may also be employed.

As specific examples of solvents, there are exemplified aliphatic hydrocarbons such as hexane, heptane, cyclohexane, and the like, aromatic hydrocarbons such as benzene, toluene, xylene, and the like, and halogenated hydrocarbons such as chloroform, dichloromethane, and the like which do not have an active hydrogen atom such as hydroxyl group.

The solvents may be preferably employed in an appropriate amount without any limitations.

The initiators, the lactone monomer and cyclic carbonate monomer which are the starting materials in the present invention, catalysts, and optional solvents may be fed into a reaction vessel in any order without any limitations for methods to be fed.

A reaction may be carried out at temperatures ranging from 0° to 200° C., and preferably from room temperatures to 180° C. or so. Even in the case when the reaction is carried out at more than 180° C., although the reaction can be carried out, the reaction rate is unpreferably lowered at temperatures higher than the initiation of decomposition of the organic aluminum-based Lewis acid.

On the contrary, even the reaction is carried out at temperatures lower than room temperatures, although no particular problems occur, the reaction rate would unpreferably lower without any advantages.

The reaction is not particularly limited by other conditions except the above-described conditions.

In the present invention, as the ring-opening reaction of cyclic monomers proceeds in the manner of "living polymerization", copolymers produced are random in spite of the state of the presence of residual cyclic monomers in the system. Accordingly, there may be also carried out a method in which an excessive amount of the cyclic monomers is charged in advance, and the unreacted cyclic monomers are separated after attaining the desired polymerization ratio.

Furthermore, an organic aluminum-based Lewis acid which is a catalyst may also be optionally separated from copolymers produced after the completion of the ring-opening addition reaction.

As methods for separating, there are exemplified solvent separation, absorption, distillation or evaporation at reduced pressures, and filtration, and the like. In the solvent separation process, there can be carried out all of the methods in which the difference in solubility between copolymers produced and the organic aluminum-based Lewis acid is applied.

In the absorption process, there can be carried out chromatography in which there are employed substrates such as activated carbon, silica gel, alumina, graphite, a polymer having hydroxyl group, amino group, carboxylic group, and sulfoxide group, and the like, and a porous ceramic, and, further, an electrophoresis method.

Furthermore, as filtration processes, a membrane process can be applied using the difference in molecular sizes.

The present invention is illustrated below by Examples.

<EXAMPLE 1: Preparation of a poly(epsilon-caprolactone-oxetane) block copolymer>

According to the ratio for charging as described in Table 1, oxetane (referred to as Ox in the Table) was firstly polymerized in a bulk state at 0° C. for 12 hours using 0.2% by mol of a triethylaluminum-water (1/0.75) based complex as an initiator based on the total amount of the monomers.

Successively, epsilon-caprolactone (referred to as CL in the Table) and 20% by weight of toluene based on the total amount of the monomers were added, followed by stirring at 60° C. for 24 hours to obtain a block copolymer. There are combinedly shown a yield, results measured with GPC [Number average molecular weight: Mn, molecular weight distribution: Weight average molecular weight (Mw)/Number average molecular weight (Mn)], and monomer ratio analyzed with an $^1$H-NMR analyzer concerning the block copolymer in the Table 1.

<COMPARATIVE EXAMPLE 1>

For reference, an oxetane homopolymer and an epsilon-caprolactone homopolymer were prepared and analyzed according to the same conditions as in Example 1, and the results are shown in Table 1.

TABLE 1

| | A | B | C | D | E | F | G | H |
|---|---|---|---|---|---|---|---|---|
| Comparative Example 1-1 | 100/0 | 1.0 | 0 | 24 | 65.6 | 12.1 | 2.61 | 100/0 |
| Example | | | | | | | | |
| 1-1 | 70/30 | 0.2 | 0–60 | 12–24 | 47.6 | 14.6 | 3.05 | 33/67 |
| 1-2 | 60/40 | 0.2 | 0–60 | 12–24 | 60.2 | 14.5 | 2.53 | 27/73 |
| 1-3 | 50/50 | 0.2 | 0–60 | 12–24 | 82.1 | 7.06 | 4.68 | 28/72 |

TABLE 1-continued

| | A | B | C | D | E | F | G | H |
|---|---|---|---|---|---|---|---|---|
| 1-4 | 40/60 | 0.2 | 0–60 | 12–24 | 84.2 | 14.0 | 2.85 | 20/80 |
| 1-5 | 30/70 | 0.2 | 0–60 | 12–24 | 79.4 | 16.3 | 2.15 | 9/91 |
| Comparative Example 1-2 | 0/100 | 0.2 | 60 | 24 | 81.7 | 6.33 | 2.53 | 0/100 |
| Comparative Example 1-3 | 0/100 | 1.0 | 60 | 24 | 89.2 | 4.39 | 1.89 | 0/100 |

In the Table 1, the abbreviation A-H shows polymerization conditions or properties in polymers as described below.

A: charging ratio of oxetane/caprolactone (% by mol)
B: catalyst concentration (% by mol)
C: polymerization temperature (°C.)
D: polymerization period (hour)
E: yield (% by weight)
F: Number average molecular weight (X10$^4$)
G: Weight average molecular weight/Number average molecular weight
H: composition ratio of oxetane/caprolactone in the copolymer analyzed with $^1$H-NMR analyzer (% by mol)

In the Table 1, 0–60 in the polymerization temperature and 12–24 in the polymerization period show that oxetane was polymerized at 0° C. for 12 hours, and then caprolactone was added to obtain a block copolymer at 60° C. for 24 hours, respectively.

<EXAMPLE 2, COMPARATIVE EXAMPLE 2>

Films having 1 cm×1 cm×500 μm were prepared from the copolymers and the homopolymers obtained in Example 1 and Comparative Example 1, and then the films were placed in a sample bottle filled with 10 milliliter of a buffer solution (pH 7.2) composed of phosphoric acid having 0.1M, and then there was added 8 μg of Cholesterol esterase which is an enzyme for degradation. Successively, the sample bottle was warmed at 37° C. and pH 7.2 for 200–300 hours in an incubator, and remained films were taken out, followed by measuring the remaining ratio of the weight after washing with water and freezedly drying. The results are shown in FIG. 1.

FIG. 1 shows that biological degradation rate is high in the two samples prepared from the block copolymers having 9 mol % and 20 mol % of oxetane contents (hereinafter, referred to as oxetane/CL in Figures) compared to the poly(epsilon-caprolactone) homopolymers.

Figure 2:
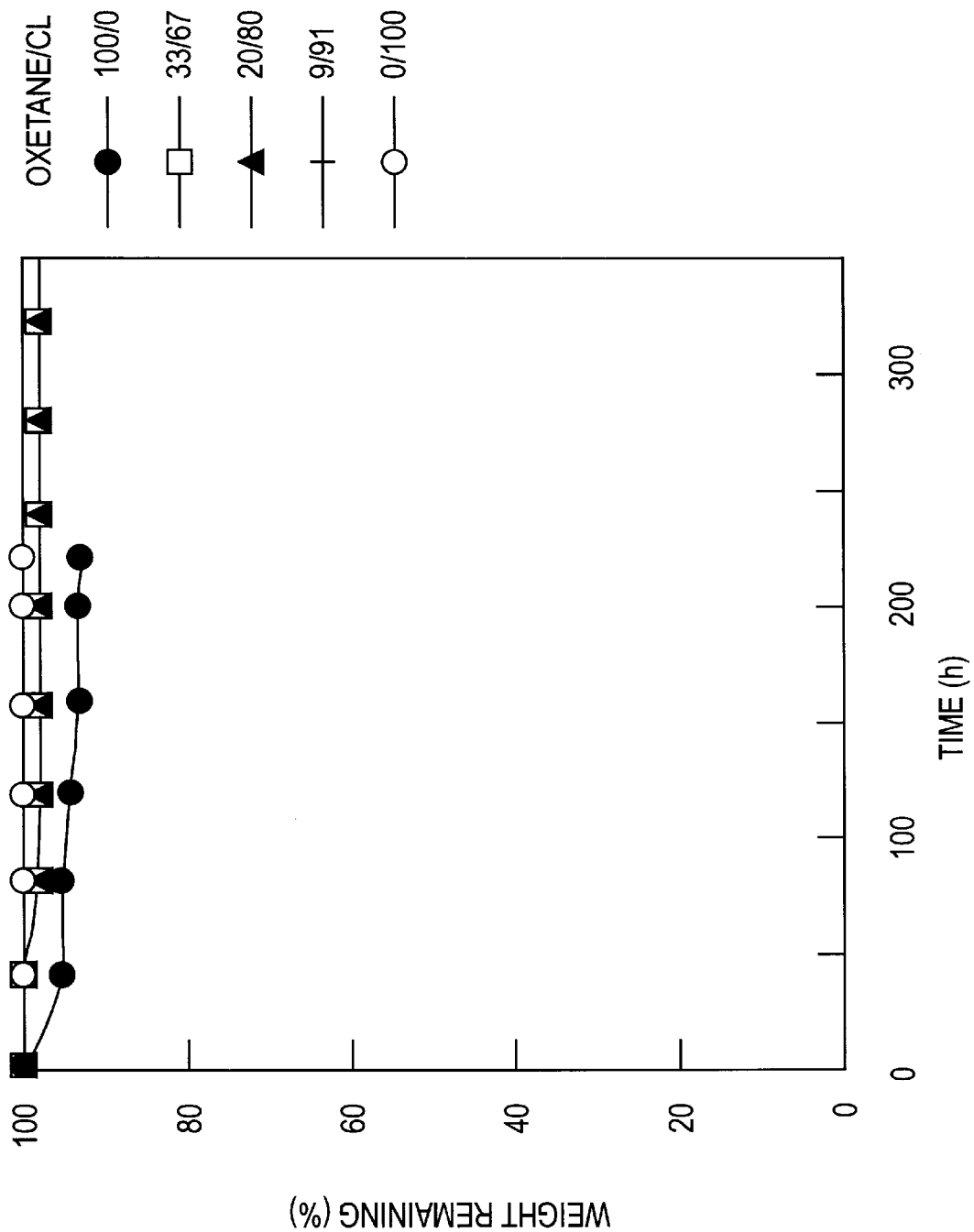
FIG. 2 is a graph representing a remaining ratio of weight versus, incubation time without an enzyme for degradation in Example 2.

It is to be noted that the weight values in all samples do not almost change in the same tests as in Example 2 carried out without any enzymes for degradation as shown in FIG. 2.

<EXAMPLE 3: Preparation of a poly(delta-valerolactone-oxetane) block copolymer>

According to the ratio for charging as described in Table 2, oxetane and delta-valerolactone (referred to as VL in Table and Figure) were mixed, and polymerized in a bulk state at 60° C. for 24 hours using 0.2% by mol of a triethylaluminum-water (1/0.75) based complex as an initiator based on the total amount of the monomers.

There are combinedly shown a yield, results measured with GPC, and monomer ratio analyzed with an $^1$H-NMR analyzer concerning the block copolymer in the Table 2.

<COMPARATIVE EXAMPLE 3>

For reference, a delta-valerolactone homopolymer was prepared in toluene using 1.0% by mol of a diethylzinchydrogen complex as an initiator at 60° C. for 15 days while stirring, and analyzed according to the same conditions as in Example 3, and the results are shown in Table 2.

TABLE 2

|  | A | B | C | D | E | F | G | H |
|---|---|---|---|---|---|---|---|---|
| Comparative Example 3-1 | 100/0 | 0.2 | 0 | 24 | 65.6 | 12.1 | 2.61 | 100/0 |
| Example |  |  |  |  |  |  |  |  |
| 3-1 | 60/40 | 0.2 | 60 | 24 | 28.0 | 5.11 | 2.65 | 19/81 |
| 3-2 | 50/50 | 0.2 | 60 | 24 | 40.2 | 5.06 | 2.51 | 14/86 |
| 3-3 | 40/60 | 0.2 | 60 | 24 | 54.3 | 3.71 | 1.59 | 12/88 |
| 3-4 | 30/70 | 0.2 | 60 | 24 | 57.3 | 4.02 | 2.00 | 6/94 |
| 3-5 | 20/80 | 0.2 | 60 | 24 | 78.2 | 2.83 | 1.59 | 5/95 |
| Comparative Example 3-2 | 0/100 | 1.0 | 60 | 15 days | 60.3 | 3.30 | 1.57 | 0/100 |

In the Table 2, the abbreviation A–H shows polymerization conditions or properties in polymers as described below.
A: charging ratio; oxetane/delta-varelolactone (% by mol)
B: catalyst concentration (% by mol)
C: polymerization temperature (°C.)
D: polymerization period (hour)
E: yield (% by weight)
F: Number average molecular weight ($\times 10^4$)
G: Weight average molecular weight/Number average molecular weight
H: composition ratio of oxetane/delta-varelolactone in the copolymer (% by mol)

<EXAMPLE 4, COMPARATIVE EXAMPLE 4>

Figure 3:
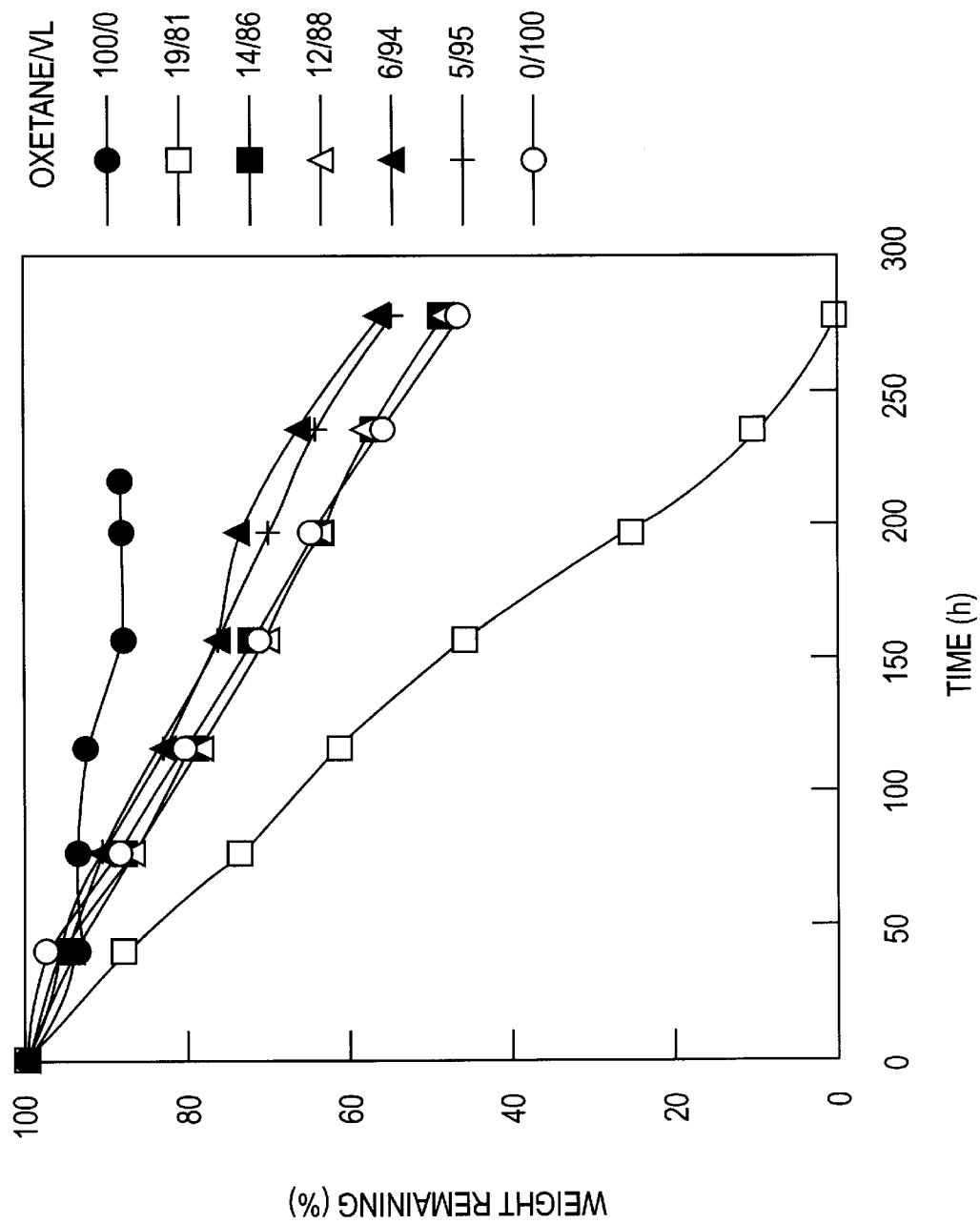
FIG. 3 (Example 4) is a graph representing a remaining ratio of weight versus incubation time by an enzyme for degradation related to the copolymer obtained in Example 3.

According to the same procedures as in Example 2, biodegradability was evaluated concerning the copolymer, the homopolymer, and the oxetane homopolymer obtained in Example 3, Comparative Example 3, and Comparative Example 1, respectively. The results obtained are shown in FIG. 3.

<Example 5, COMPARATIVE EXAMPLE 5>

Figure 4:
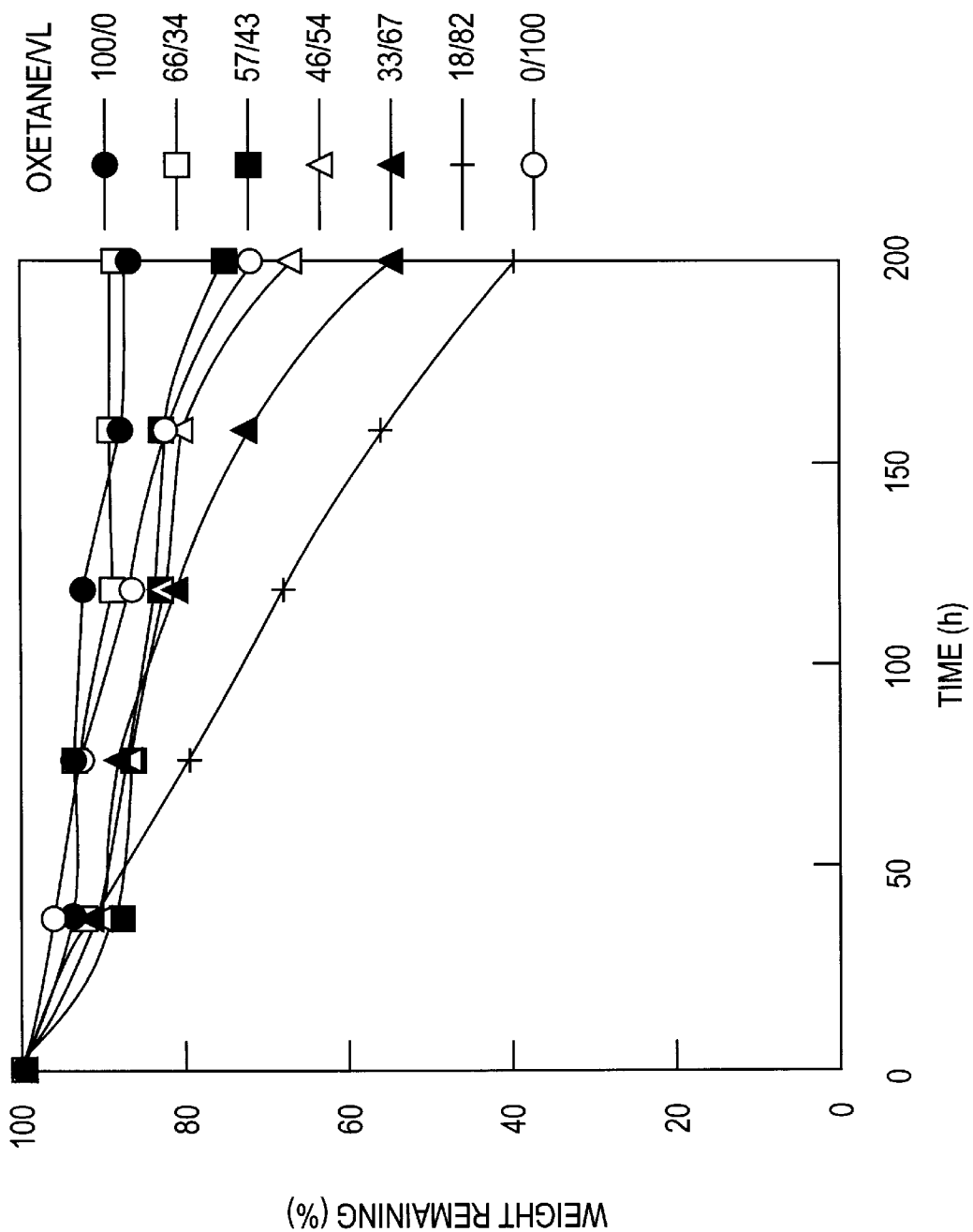
FIG. 4 is a graph representing a remaining ratio of weight versus incubation time without an enzyme for degradation related to the polymer obtained in Example 5.

The epsilon-caprolactone homopolymer and oxetane homopolymer obtained in Comparative Example 1 were mixed according to the molar ratio as described in FIG. 4, followed by dissolving into chloroform and evaporating chloroform to obtain a film composed of the mixed polymers.

The film was employed to evaluate biodegradability according to the same procedures as in Example 2. The results obtained are shown in FIG. 4. It was confirmed that even a blended polymer composed of the epsilon-caprolactone homopolymer and oxetane homopolymer exhibits a better biodegradability than the respective homopolymers depending upon blend ratio.

<EXAMPLE 6, COMPARATIVE EXAMPLE 6: Preparation of a random block copolymer composed of epsilon-caprolactone and dimethyltrimethylene carbonate>

Epsilon-caprolactone, dimethyltrimethylene carbonate (referred to as DTC in Table and Figure), and toluene were mixed and copolymerized at 60° C. for 4 hours using 0.2% by mol of a triethylaluminum-water (1/0.75) based complex as an initiator based on the total amount of the monomers.

The monomer ratio and number average molecular weight measured width an $^1$H-NMR concerning the copolymer obtained are shown in Table 3.

Furthermore, an epsilon-caprolactone homopolymer and a dimethyltrimethylene carbonate homopolymer were prepared according to the same conditions as in Example 6. Molecular weight values of the homopolymers are shown in Table 3.

TABLE 3

|  | A | E | F | G |
|---|---|---|---|---|
| Comparative Example 6-1 | 100/0 | 94.5 | 230 | 1.55 |
| Example |  |  |  |  |
| 6-1 | 87/13 | 87.2 | 131 | 1.52 |
| 6-2 | 70/30 | 97.2 | 196 | 1.71 |
| 6-3 | 55/45 | 97.5 | 211 | 1.52 |
| 6-4 | 46/54 | 92.8 | 86.9 | 1.49 |
| 6-5 | 27/73 | 64.4 | 347 | 2.06 |
| 6-6 | 16/84 | 67.3 | 364 | 1.70 |
| Comparative Example 6-2 | 0/100 | 60.6 | 131 | 1.83 |

In the Table 3, the abbreviation A–G shows polymerization conditions or properties in polymers as described below.
A: caprolactone/dimethyltrimethylene carbonate in the copolymer analyzed with $^1$H-NMR analyzer (% by mol)
E: yield (% by weight)
F: Number average molecular weight ($\times 10^3$)
G: Weight average molecular weight/Number average molecular weight
<Example 7, Comparative Example 7>

<EXAMPLE 7, COMPARATIVE EXAMPLE 7>

Figure 5:
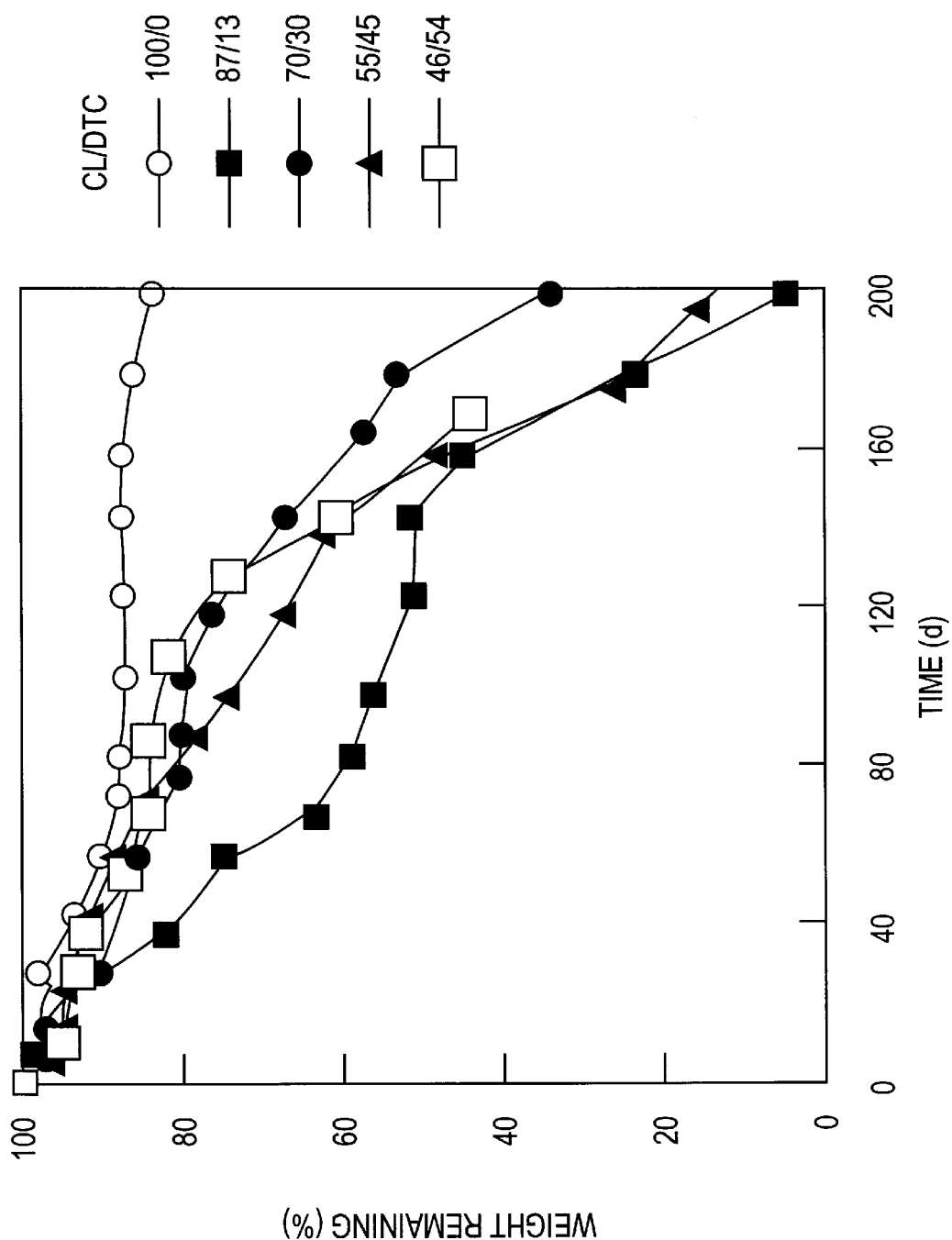
FIG. 5 (Example 7) is a graph representing a remaining ratio of weight versus the time of period buried in active sludge related to the polymer obtained in Example 6.

Films prepared from the copolymers and the epsilon-caprolactone homopolymer obtained in Example 6 and Comparative Example 6 were buried in an active sludge for 200 days. The films were taken out at fixed time lapses, followed by washing with water and freezedly drying to measure remaining ratio of the weight. The results obtained are shown in FIG. 5.

All the copolymers exhibit a better biodegradability than the epsilon-caprolactone homopolymer.

<EXAMPLE 8, COMPARATIVE EXAMPLE 8>

Figure 6:
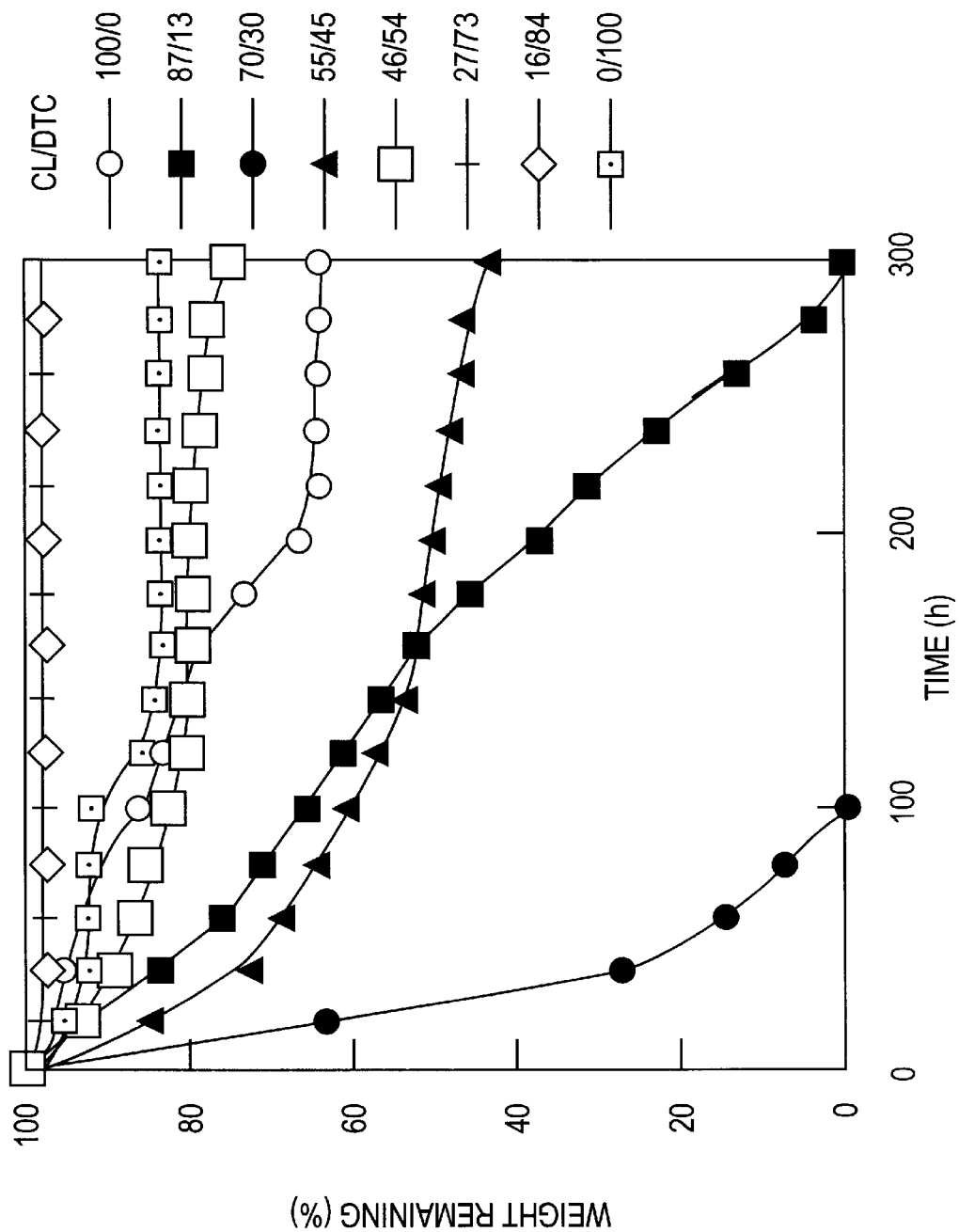
FIG. 6 (Example 8) is a graph representing a remaining ratio of weight versus incubation time by an enzyme for degradation related to the copolymer obtained in Example 6.
Figure 7:
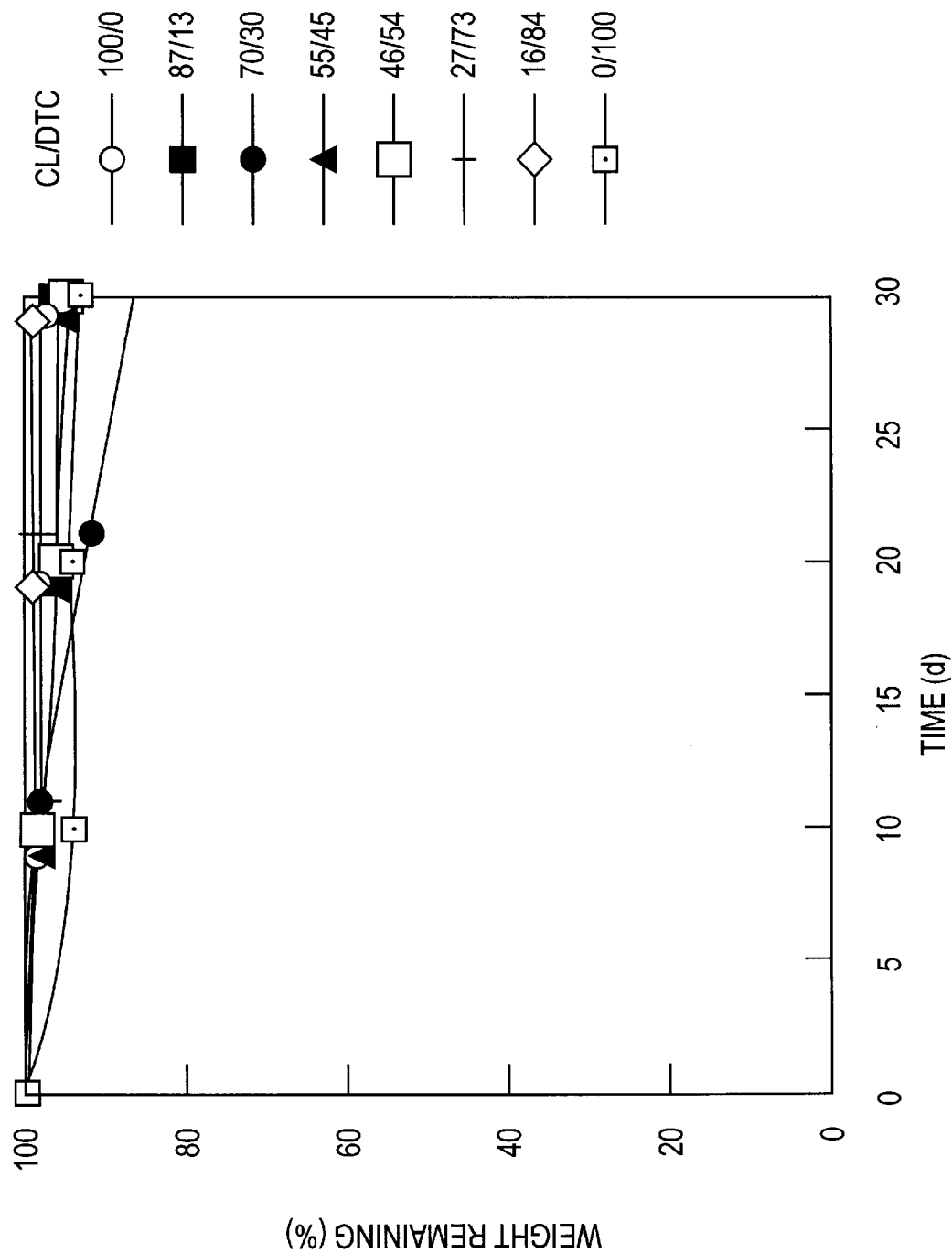
FIG. 7 is a graph representing a remaining ratio of weight versus incubation time without an enzyme for degradation in Example 8.

The copolymers and the epsilon-caprolactone homopolymers obtained in Example 6 and Comparative Example 6, respectively, were employed to evaluate a biodegradability according to the same conditions as described in Example 2. The results obtained are shown in FIG. 6. Furthermore, the same tests were carried out without any enzymes. As shown in FIG. 7, weight loss was almost no observed in all the samples.

<EXAMPLE 9, COMPARATIVE EXAMPLE 9, EXAMPLE 10, COMPARATIVE EXAMPLE 10>

Figure 8:
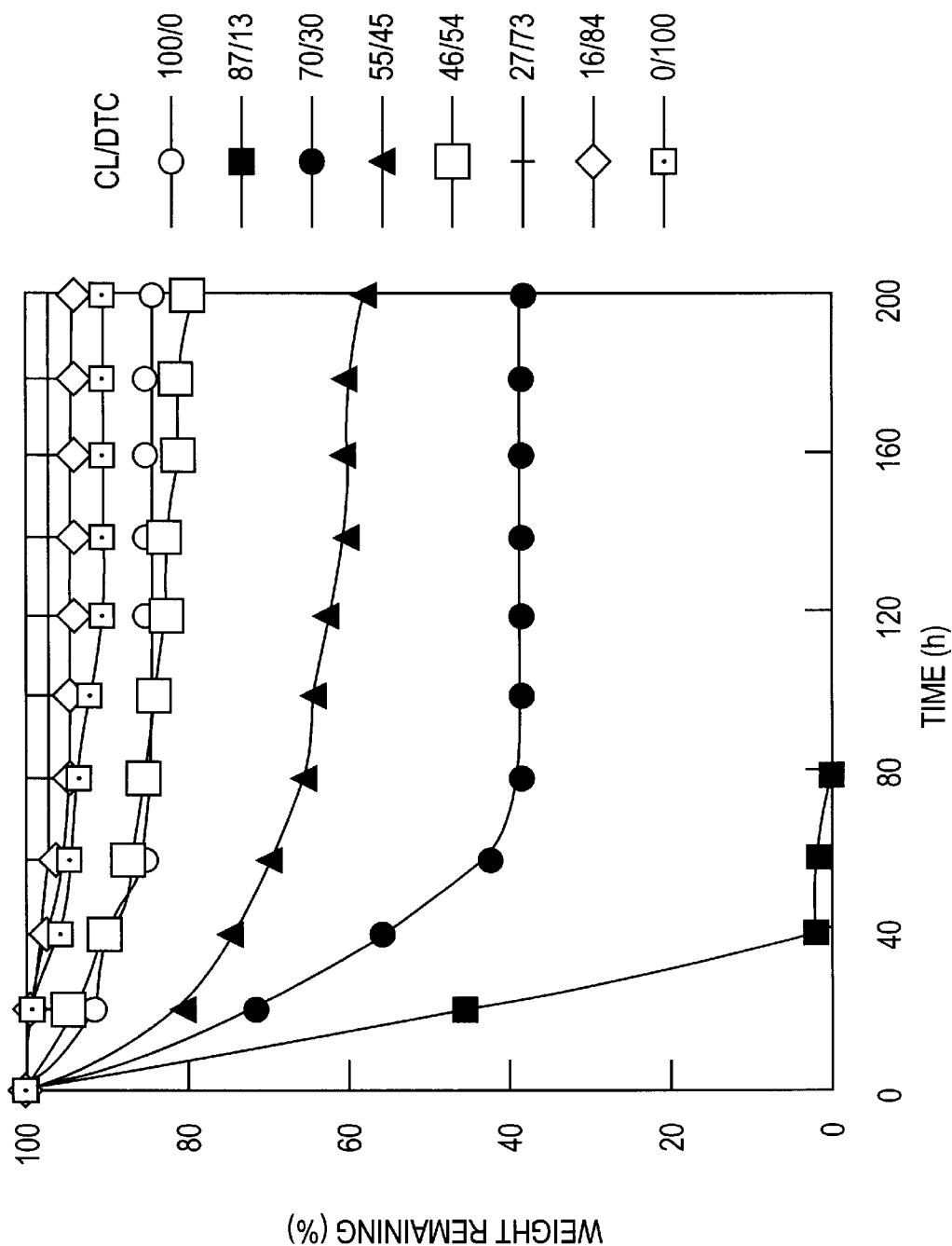
FIG. 8 (Example 9) is a graph representing a remaining ratio of weight versus incubation time by the enzyme Lipase B for degradation related to the copolymer obtained in Example 6.
Figure 9:
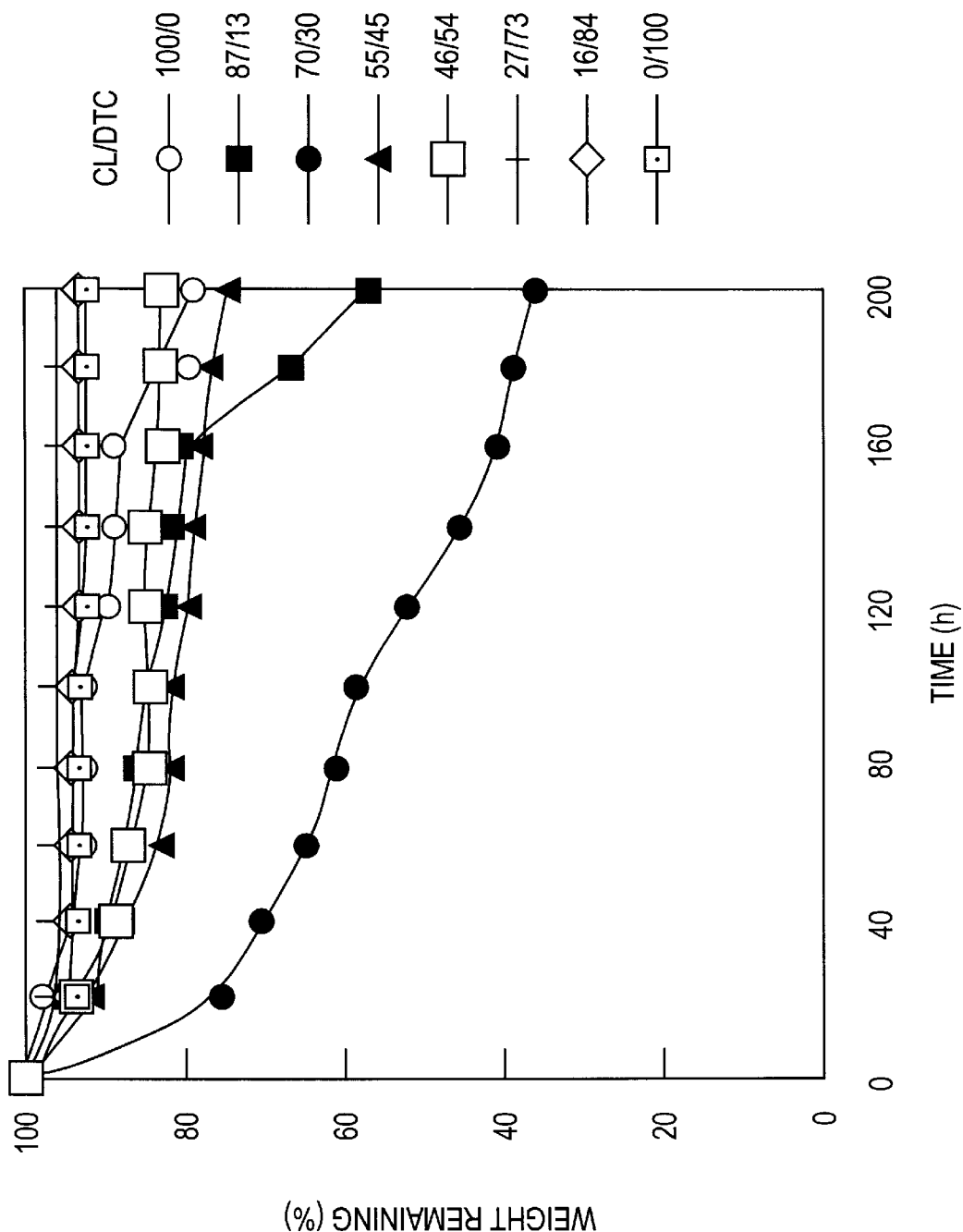
FIG. 9 (Example 9) is a graph representing a remaining ratio of weight versus incubation time by the enzyme Rhizopus delmer Lipase for degradation related to the copolymer obtained in Example 6.

Example 8 was repeated except that the copolymers and the homopolymers obtained in Example 6 and Comparative Example 6, respectively, were employed, and the enzyme Rhizopus delemer Lipase B (pH 9.0, 37° C.) for degradation was employed in place of the enzyme Cholesterol esterase (pH 7.2). The results obtained are shown in FIGS. 7 and 8, respectively.

<Reference Example 1>

By the analysis results with $^1$H-NMR concerning degradation components generated from the epsilon-caprolactone homopolymer and the epsilon-caprolactone-dimethyltrimethylene carbonate block copolymer in Example 8, it was confirmed that 6-hydroxycaproic acid is produced.

Figure 10A:
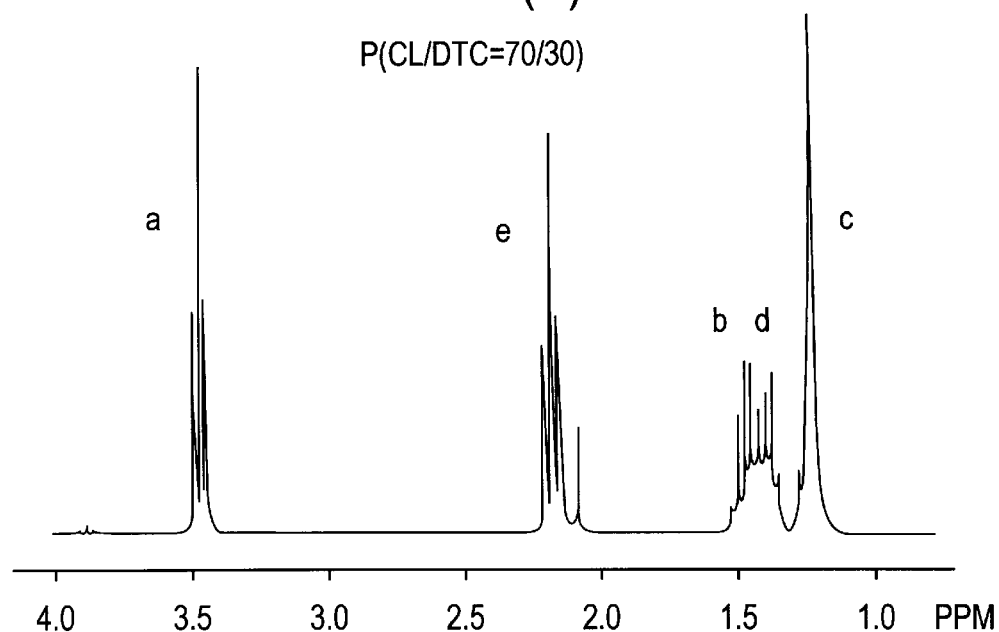
FIG. 10 (A) is an 1H-NMR chart related to the components produced by degradation in Example 8, and FIG. 10 (B) is an 1H-NMR chart related to the caprolactone homopolymer (CL).
Figure 10B:
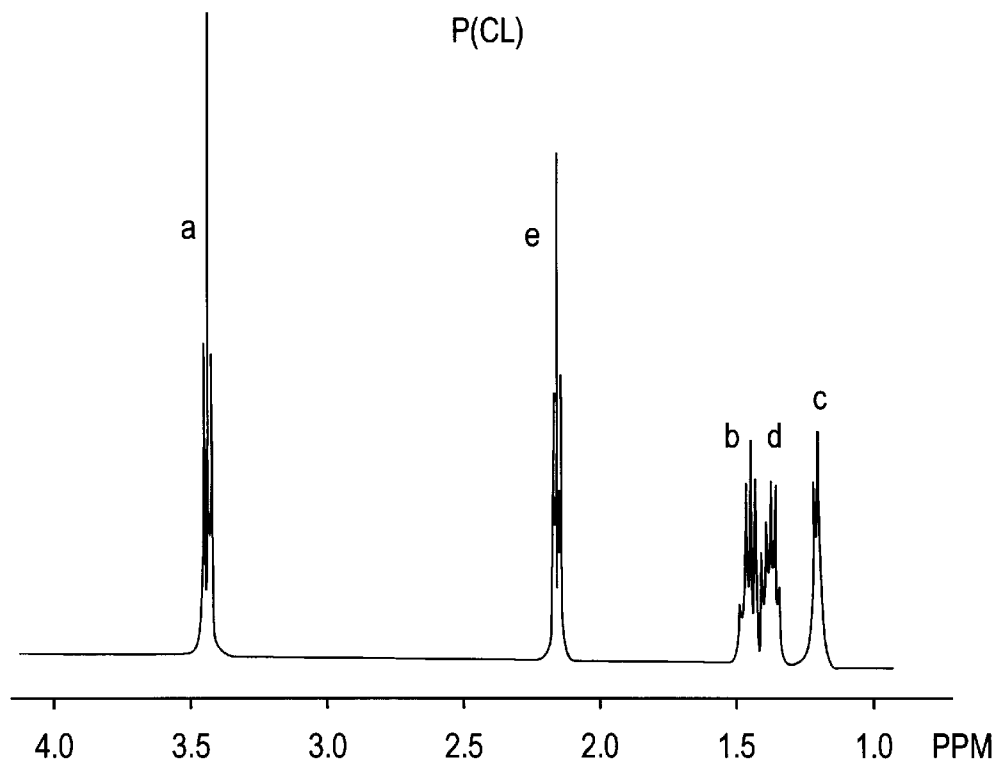

FIG. 10(A) is an $^1$H-NMR chart. Furthermore, FIG. 10(B) is an $^1$H-NMR chart concerning degradation components generated from the epsilon-caprolactone homopolymer.

<EXAMPLE 11, COMPARATIVE EXAMPLE 11: Preparation of a delta-verelolactone-dimethyltrimethylene carbonate block copolymer>

Delta-varelolactone, dimethyltrimethylene carbonate, and toluene were mixed and copolymerized at 60° C. for 4 hours using 0.2% by mol of a triethylaluminum-water (1/0.75) based complex as an initiator based on the total amount of the monomers.

The monomer ratio and number average molecular weight measured with an $^1$H-NMR concerning the copolymer obtained are shown in Table 4.

TABLE 4

|  | A | E | F | G |
|---|---|---|---|---|
| Comparative Example 11-1 | 100/0 | 99.0 | 224 | 1.89 |
| Example |  |  |  |  |
| 11-1 | 93/7 | 99.0 | 211 | 2.07 |
| 11-2 | 75/25 | 79.9 | 233 | 1.42 |
| 11-3 | 57/43 | 59.2 | 116 | 1.69 |
| 11-4 | 47/53 | 78.6 | 112 | 1.96 |
| 11-5 | 33/67 | 75.9 | 135 | 1.66 |
| Comparative Example 11-2 | 0/100 | 60.6 | 128 | 1.58 |

In the Table 4, the abbreviation A-G shows polymerization conditions or properties in polymers as described below.

A: delta-valerolactone/dimethyltrimethylene carbonate in the copolymer (% by mol)

E: yield (% by weight)

F: Number average molecular weight (X10$^3$)

G: Weight average molecular weight/Number average molecular weight

<COMPARATIVE EXAMPLE 12: Preparation of a delta-valerolactone homopolymer>

A delta-valerolactone homopolymer was prepared according to the same conditions as in Example 6. Molecular weight of the homopolymer is shown in Table 4.

<EXAMPLE 12, COMPARATIVE EXAMPLE 13>

Figure 11:
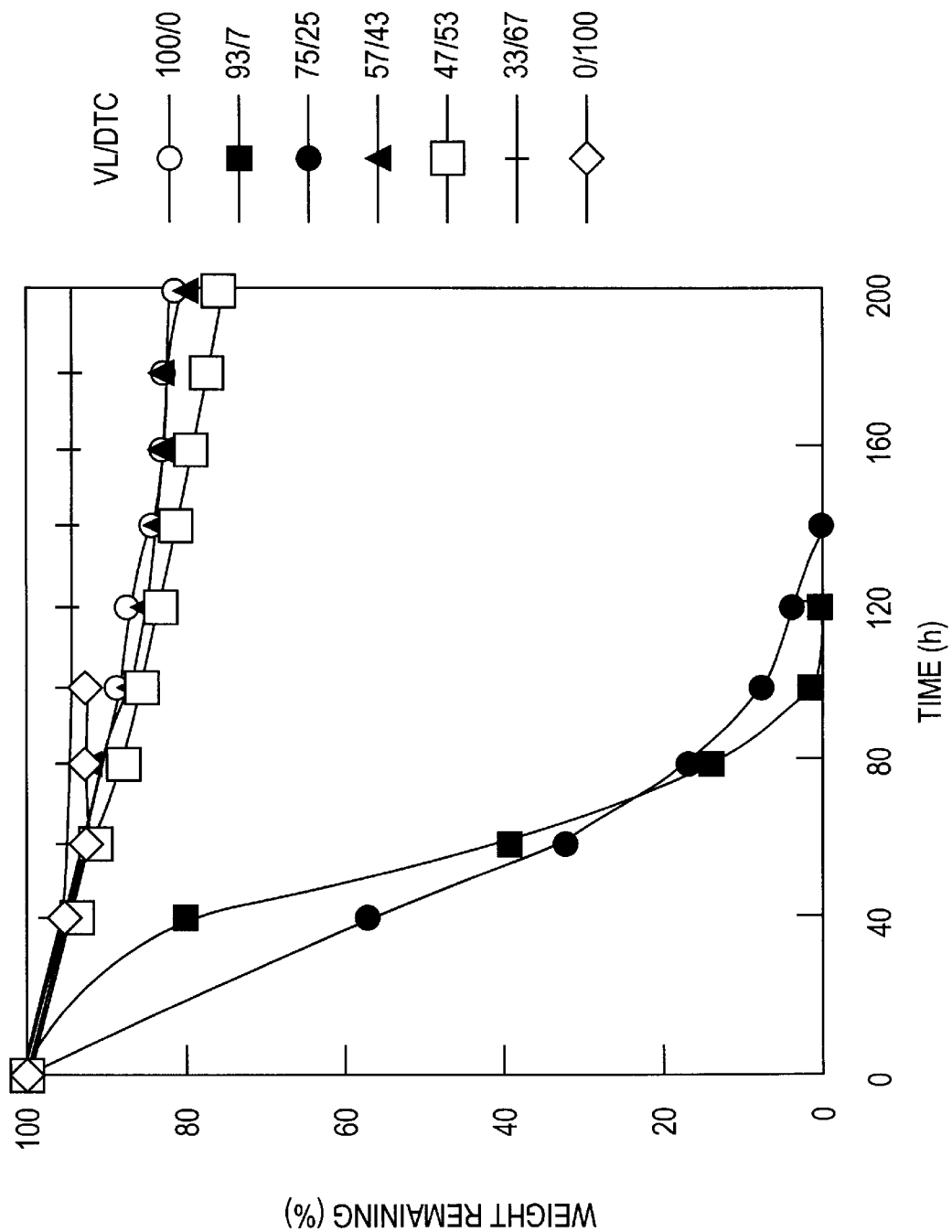
FIG. 11 (Example 12 and Comparative Example 13) is a graph representing a remaining ratio of weight versus incubation time by the enzyme for degradation related to the dimethyltrimethylene carbonate (DTC) homopolymer (Comparative Example 6), the valerolactone-dimethyltrimethylene carbonate (VL/DTC) block copolymer (Example 11), and the valerolactone (VL) homopolymer (Comparative Example 12).

Example 2 was repeated except that the copolymers and the homopolymers obtained in Comparative Example 6, Example 11, and Comparative Example 12, respectively, were employed to evaluate biodegradability. The results obtained are shown in FIG. 11.

<REFERENCE EXAMPLE 1: Preparation of an organic aluminum-based Lewis acid>

2,6-ditert-butyl-methylphenol (2.76 g, 12.5 millimole) was dissolved into 10 ml of dried hexane, and then trimethyl-aluminum (0.6 ml, 6.25 millimole) was added dropwise at 0° C. to obtain a suspension. The suspension obtained was heated to 60° C. in order to dissolve it. After the suspension was completely dissolved, it was placed for 10 hours at room temperatures to obtain an aluminum-based Lewis acid substituted by two-fold by mol of 2,6-ditert-butyl-methylphenol (hereinafter, referred to as MeAlBMP) which is a white-colored crystalline. The crystalline was washed twice with dried hexane, and dried in vacuo.

<EXAMPLE 13: Preparation of a lactone-carbonate random copolymer>

A 1-liter dried flask made of glass was charged with 0.186 g (3 millimole) of ethylene glycol as an initiator, 428 g (3.75 mol) of epsilon-caprolactone as a lactone monomer, 162.5 g (1.25 mol) of neopentyl glycol carbonate as a cyclic carbonate monomer, and 0.295 g (500 ppm) of MeAlBMP obtained in the Reference Example 1 as an aluminum-based Lewis acid catalyst, while purging with dried nitrogen gas, followed by stirring at 140° C. for 3 hours to obtain a transparent lactone-carbonate random copolymer. The random copolymer obtained was analyzed with a GPC to obtain a number average molecular weight of 187,000 and molecular weight distribution (Mn/Mw) of 1.28 based on a standard Polystyrene.

Furthermore, it was confirmed that unreacted neopentyl glycol carbonate was remained in the content of 0.56%.

Figure 12:
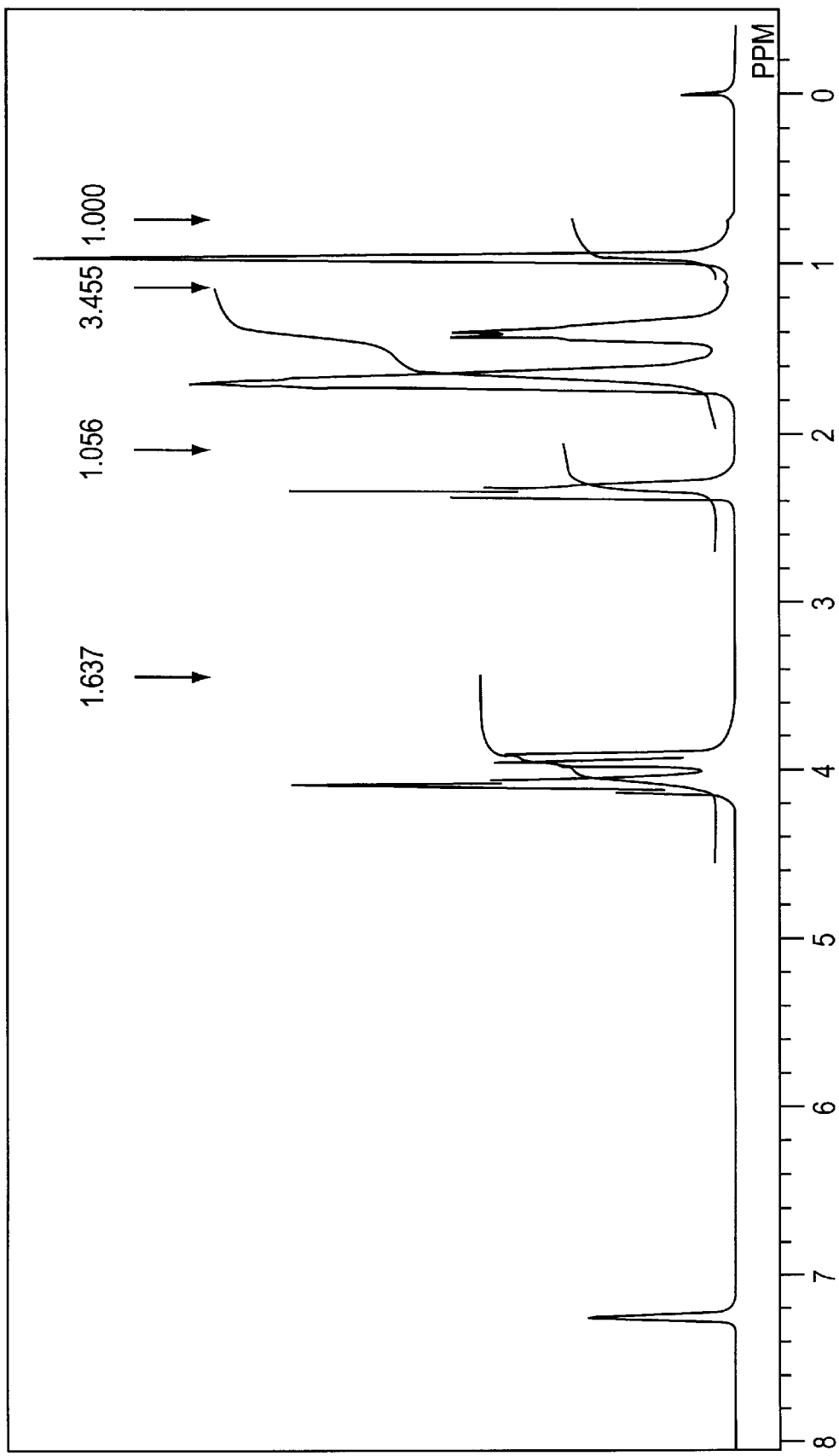
FIG. 12 is an 1H-NMR chart related to the random copolymer obtained in Example 14.

FIG. 12 is an $^1$H-NMR chart related to the random copolymer, and shows that the molar ratio of epsilon-caprolactone/neopentyl glycol carbonate in the copolymerization is 76/24.

Still further, it is confirmed that a plurality of peaks in a range of δ3.8–4.0 are assigned to carbonate, resulting in clearly being a random copolymer.

(EXAMPLE 14: Preparation of a lactone-lactone-carbonate random copolymer>

A 1-liter dried flask made of glass was charged with 0.62 g (10 millimole) of ethylene glycol as an initiator, 342.4 g (3 mol) of epsilon-caprolactone and 128.2 g (1 mol) of 4-methyl-epsilon-caprolactone as lactone monomers, 130.1 g (1 mol) of neopentyl glycol carbonate as a cyclic carbonate monomer, and 0.12 g (200 ppm) of MeAlBMP obtained in the Reference Example 1 as an aluminum-based Lewis acid catalyst, while purging with dried nitrogen gas, followed by stirring at 100° C. for 12 hours to obtain a colorless transparent lactone-carbonate random copolymer.

The random copolymer obtained was analyzed with a GPC to obtain a number average molecular weight of 59,000 and molecular weight distribution (Mn/Mw) of 1.22 based on a standard Polystyrene. Furthermore, unreacted monomers were not detected.

<COMPARATIVE EXAMPLE 14: Preparation of a lactone-carbonate random copolymer using stannous octoate as a catalyst>

For reference, the same procedures as in Example 13 were repeated except that 0.295 g (500 ppm) of stannous octoate described in the WO89/5664 Publication and WO91/16887 was employed as a catalyst to prepare a random copolymer in place of MeAlBMP. Even after reacting while stirring at 140° C. for 3 hours, as a large amount of monomers were remained, the reaction was further continued. After 48 hours, as epsilon-caprolactone in the random copolymer decreased to less than 1%, the reaction was terminated. Although the random copolymer was transparent, it was slightly yellowed.

It was confirmed by GPC analysis that number average molecular weight is 126,000 and molecular weight distribution is 1.71. Furthermore, it was confirmed that 4.83% of unreacted neopentylglycol carbonate was remained and 0.67% of unreacted epsilon-caprolactone was remained.

<EXAMPLE 15 and COMPARATIVE EXAMPLE 15: Biodegradation test in an activated sludge of a lactone-carbonate random copolymer and a caprolactone homopolymer>

Example 7 and Comparative Example 7 were repeated except that there were employed films having 30 cm×30 cm×0.5 mm prepared from the lactone-carbonate random copolymer prepared in Example 13 and an epsilon-caprolactone homopolymer having a number average molecular weight of 100,00 (PLACCEL H-7 DD001 manufactured by Daicel Chemical Industries, Ltd.) for reference. Films buried in an activated sludge were taken out at a fixed interval over 200 days, and the films were washed with water, followed by being freezedly dried to evaluate retention ratio of the weight.

Results are shown in FIG. 12.

FIG. 12 shows that the lactone-carbonate random copolymer exhibits more excellent biodegradability than the epsilon-caprolactone homopolymer.

While the invention has been described in detail and with reference to specific embodiments thereof, it will be apparent to one skilled in the art that various changes and modifications can be made therein without departing from the spirit and scope thereof.

What is claimed is:

1. A biodegradable copolymer having a number average molecular weight ranging from 1,000 to 1,000,000 consisting essentially of (A) from 5 to 99% by mol of epsilon-caprolactone or delta-valerolactone structural units and (B) from 95 to 1% by mol of oxetane structural units, said structural units being combined in the state of a block, and containing an organic aluminum-based Lewis acid represented by general formula (I)

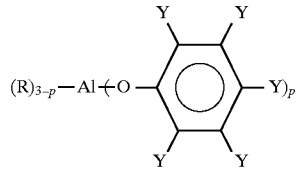

(I)

wherein R is an alkyl group having a carbon number ranging from 1 to 4, Y is independently selected from a substituted group, and p is any one of 1, 2 and 3.

2. A biodegradable copolymer as set forth in claim 1, wherein said average number molecular weight ranges from 30,000 to 300,000.

3. A biodegradable article molded from a copolymer having a number average molecular weight ranging from 1,000 to 1,000,000 consisting essentially of (A) from 5 to 99% by mol of epsilon-caprolactone or delta-valerolactone structural units and (B) from 95 to 1% by mol of oxetane structural units, said structural units being combined in the state of a block, and containing an organic aluminum-based Lewis acid represented by general formula (I)

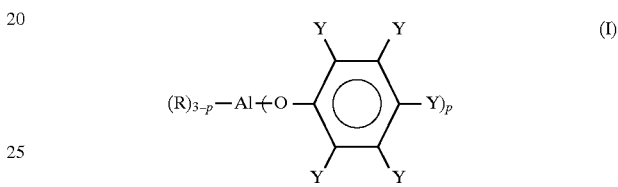

wherein R is an alkyl group having a carbon number ranging from 1 to 4, Y is independently selected from a substituted group, and p is any one of 1, 2 and 3.

* * * * *